United States Patent [19]
Sato

[11] Patent Number: 6,164,552
[45] Date of Patent: Dec. 26, 2000

[54] FORMATION METHOD OF TWO-DIMENSIONAL CODE

[76] Inventor: Kazuo Sato, 1001-128, Aza Mura-higashi, Oaza Iidera, Mondamachi, Aiduwakamatsu-shi, Fukushima, 965-0846, Japan

[21] Appl. No.: 09/329,294

[22] Filed: Jun. 10, 1999

[51] Int. Cl.[7] .................................................. G06K 19/06
[52] U.S. Cl. ........................................... 235/494; 235/456
[58] Field of Search ...................................... 235/494, 456

[56] References Cited

U.S. PATENT DOCUMENTS 4,939,354   7/1990   Priddy et al. ............................ 235/494

*Primary Examiner*—Harold I. Pitts
*Attorney, Agent, or Firm*—Snider & Associates; Ronald R. Snider

[57] ABSTRACT

A formation method of a two-dimensional code according to the present invention is characterized in that the method comprises the steps of: substituting a square unit cell, in which a plurality of dark round dots 6 are arranged in a matrix, for a dark unit cell from image data of a two-dimensional code 1 formed in a bright and dark pattern to transform the image data; burning these dark round dots 6 on a marking surface with a laser beam; and forming the two-dimensional code in a dark and bright pattern formed by combining dark unit cells 2A, formed with dark round dots 6, and bright unit cells 2b to which laser burning has not been performed.

2 Claims, 5 Drawing Sheets

TWO-DIMENSIONAL CODE 1

FORMATION METHOD OF TWO-DIMENSIONAL CODE

BACKGROUND OF THE INVENTION

1. Field of the Invention

The present invention relates to a formation method of a two-dimensional code by means of laser burning.

2. Description of the Prior Art

Generally, bar codes composed of printed stripes are used on packages of goods for merchandise control and accounting at a point of sales. Nevertheless, this bar code composed of stripes has a small amount of data to be recorded in comparison with an area to be used, and hence can be used only for control of article numbers of goods and the like.

For this reason, recently, a two-dimensional code that is formed by a matrix having a bright and dark dotted pattern has been used. Since this code can record 12 alphanumeric characters per 1 mm square, the data amount per unit area is extremely large in comparison with that of the bar code. Therefore, this code has such advantages that the code can not only record plenty of data but also read the data from any direction, that is, the direction of 360° with a reader. Furthermore, since this code not only has a function of recovering data even if a part of the code is damaged or stained, but also can secretly manage information by encrypting data, its application has been widespread.

When this two-dimensional code is generated, image data composed of a matrix having a bright and dark pattern is generated on a screen of a personal computer with using a graphic software. Conventionally, a two-dimensional code is formed on a marking surface with a method such as presswork, printing with a printer, and laser burning on the basis of a two-dimensional code generated from this image data.

A two-dimensional code 1, as shown in FIG. 8, records data by forming a plurality of cells 2 through dividing an inside of a square or a rectangular into a matrix, and arraying cells 2a, which are derived from cells 2 and are darkly filled, and bright cells 2b. For example, if 25 pieces of square cells 2 are formed by dividing a two-dimensional code 1, having an area of 1.2 mm square, into squares with 5 rows and 5 columns, each cell 2 is formed in the shape of a square each side of which is 240 μm long.

When a cell 2a, which is darkly filled, is formed on a marking surface of metal, resin, or the like with heat of a laser beam by irradiating the laser beam on the marking surface, first, as shown in FIG. 9A, a cell 2 is linearly burnt with the laser beam sequentially from an upper portion to a lower portion with making the laser beam horizontally scan. Finally, as shown in FIG. 9B, the dark cell 2a is formed by burning the marking surface in a square totally.

In this system, since there is no regularity in radiation intervals of a laser, the laser beam may be irradiated out of a cell area, and hence, for example, as shown in FIG. 10, runover portions 3, caused by the laser beam deviating horizontally, and a blank portion 4 may arise in some cases. If a two-dimensional code 1 including such irregular cells 2a is formed on a marking surface as shown in FIG. 11, this causes a problem that the code may be read as erroneous data by a reader. In particular, in case of a minute two-dimensional code with only an area of 1 mm square, read errors increase, and hence this causes a problem that an advantage of the two-dimensional code which can record plenty of information is extinguished.

This is because it is not defined in a conventional system that vector data necessary for forming a cell exists only in a cell area. Thus, the conventional system does not recognize each of 25 cells, formed in a matrix with 5 rows and 5 columns, as a unit cell, but generates the two-dimensional code by sequentially combining line-drawing continuous data in bit-map data on the basis of image data. Therefore, a coordinate management system of recognizing a starting point and an end point of marking is not adopted, and hence this causes a problem that irregular cells are formed.

BRIEF SUMMARY OF THE INVENTION

1. Object of the Invention

An object of the present invention is to provide a formation method of a two-dimensional code that removes the above-described disadvantages, that is particularly effective in the case of a two-dimensional code composed of minute cells by increasing read accuracy through directly irradiating a marking surface of metal, resin, ceramics, transparent material, or the like with a laser beam, forming cells with a dot structure on the marking surface by thermal deformation, and that increases workability by accurately forming a two-dimensional code in a short time.

2. Summary of the Invention

A formation method of a two-dimensional code as described in claim 1 of the present invention is a formation method of a two-dimensional code for forming the two-dimensional code, in which unit cells in a dark and bright pattern are arranged in a matrix on a marking surface by laser burning, characterized in that the method comprises the steps of: substituting a square unit cell, in which dots are arranged in an n×n or n×m matrix (n and m are integers), for a unit cell, forming a dark or bright unit cell by the laser burning, in image data of the two-dimensional code; irradiating the marking surface of metal, resin, ceramics, transparent material, or the like with a laser beam for direct burning; forming dots on the marking surface through thermal deformation; and forming the two-dimensional code in a dark and bright pattern formed by combining dark or bright unit cells and bright or dark unit cells to which the laser burning has not been performed.

In addition, a formation method of a two-dimensional code as described in claim 2 of to the present invention is characterized in that a diameter of the dot is made a beam diameter of a laser beam.

DETAILED DESCRIPTION OF THE PREFERRED EMBODIMENTS

Figure 1:
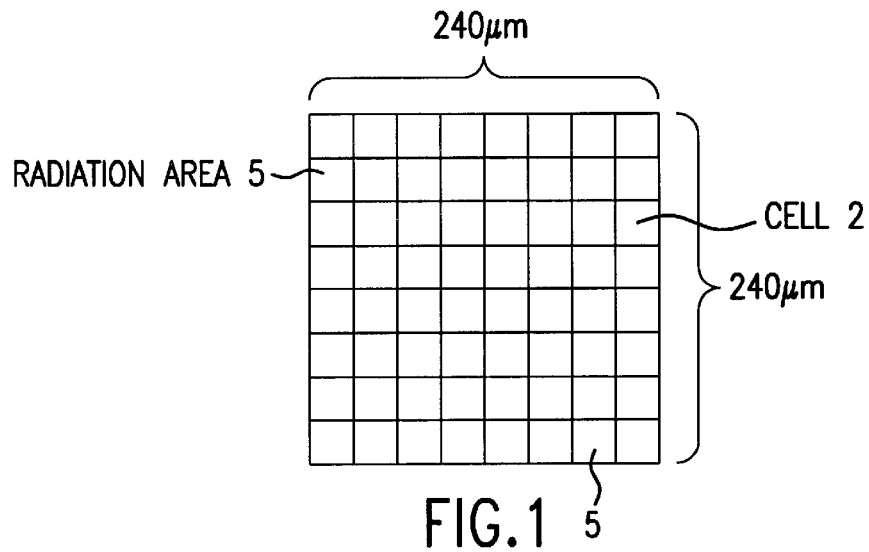
FIG. 1 is a top view showing a state of dividing a cell into a plurality of radiation areas according to an embodiment of the present invention.
Figure 2:
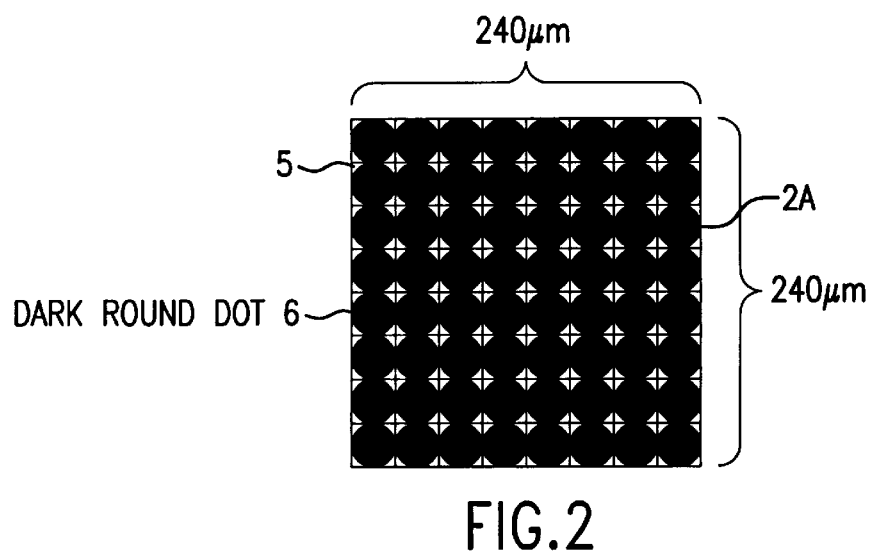
FIG. 2 is a top view showing a state of forming dark round dots in one of radiation areas shown in FIG. 1.
Figure 3:
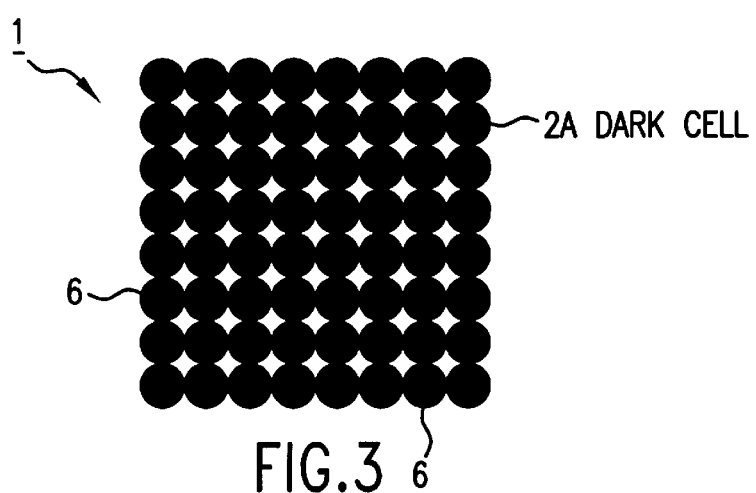
FIG. 3 is a top view showing a dark cell formed by arranging a plurality of dark round dots in a matrix.

Hereinafter, an embodiment of the present invention in a case of generating a two-dimensional code on a marking surface of an opaque material such as metal, resin, ceramics or the like will be described in detail with reference to FIGS. 1 to 4. A cell on a marking surface which corresponds to a dark cell, for example, the cell 2 which has the shape of a square whose side is 240 μm long, in image data of the two-dimensional code composed with arranging dark and bright unit cells in a matrix, is divided into 64 radiation areas 5 with 8 rows by 8 columns, as shown in FIG. 1. A laser beam is sequentially applied to each of these divided radiation areas 5 to roundly burn each of the radiation areas 5, with performing position control in the X-Y directions, and as shown in FIG. 2, 64 dark round dots 6 are formed. In this case, each dark round dot 6 contacts to an adjacent dark round dot 6, and overlapping is not necessary. In this manner, by arranging 64 dark round dots 6 with 8 rows by 8 columns in a matrix as shown in FIG. 3, a dark cell 2A is formed on the marking surface of metal, resin, ceramics, or the like.

In addition, this dark round dot 6 can be formed by intermittently applying a laser beam on a marking surface with performing position control of the laser beam in the X-Y directions. Therefore, this method can largely reduce formation speed in comparison with a conventional method of burning a cell in a dark square shape by linearly burning the cell sequentially from an upper side to a lower side with making the laser beam horizontally scan. Furthermore, by making a diameter of the dark round dot 6 to be the same as a beam diameter of the laser beam, it is possible to form the dark round dots 6 at the radiation intervals of the laser beam, and hence it is possible to generate the two-dimensional code 1 in a short time.

Figure 4:
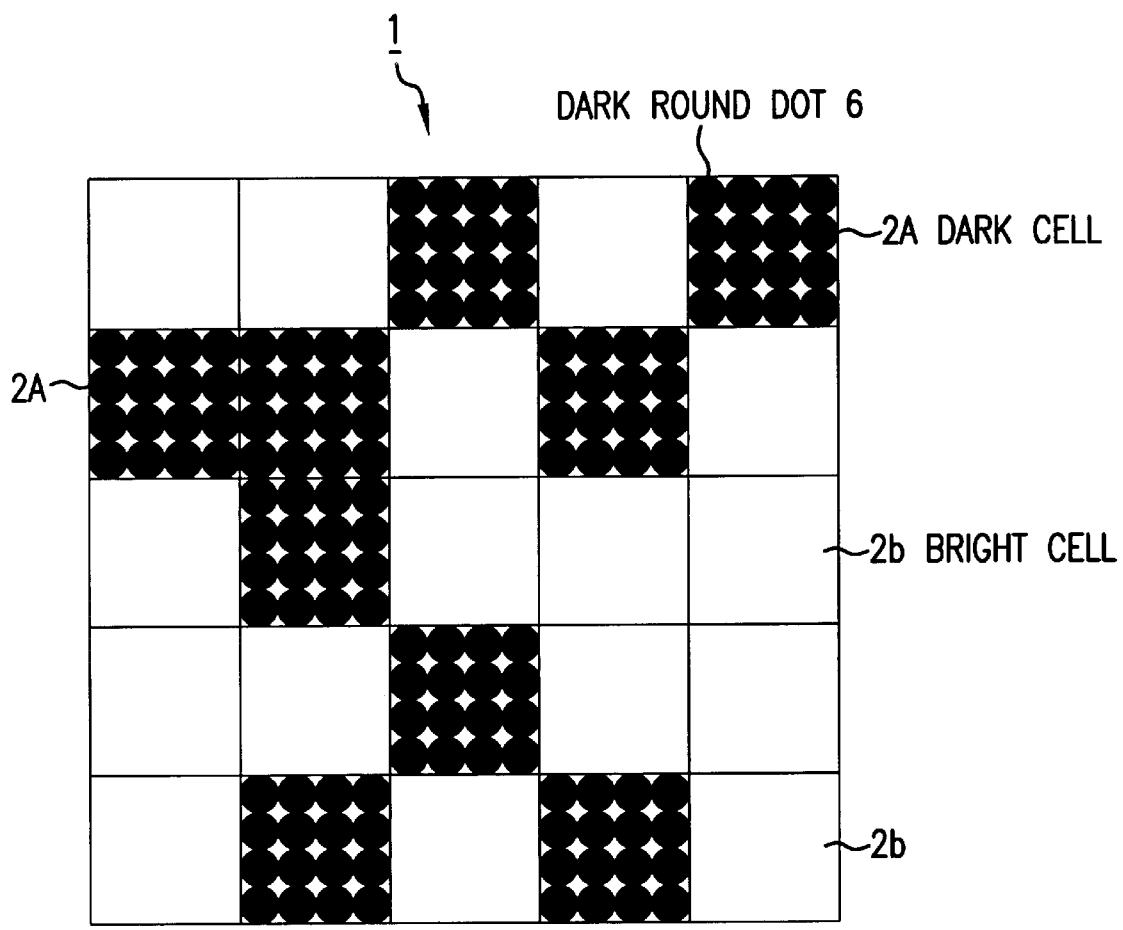
FIG. 4 is a top view showing a two-dimensional code composed of dark cells, each of which is formed by arranging the plurality of dark round dots, and bright cells.

Thus, the conventional method forms a dark cell 2a by darkly filling the cell in a square shape at the time of burning the dark cell according to image data on the marking surface. Nevertheless, the present invention substitutes 64 dark round dots 6 arranged in 8 rows by 8 columns. In consequence, as shown in FIG. 4, by making a part, on which dark round dots 6 arranged, for example, in 4 rows by 4 columns are burnt, as a dark unit cell 2A and making a part, which is not burnt with the laser beam, as a bright cell 2b, the two-dimensional code 1 is generated on the marking surface of metal, resin, ceramics, or the like.

When the two-dimensional code 1 generated in this manner is read with a reader, the reader recognizes a corner part of the dark cell 2A and judges that the cell is a dark cell. Therefore, it is possible to recognize the cell as a dark cell similarly to the conventional cell 2a that is darkly filled, even if a blank portion exists in the dark cells 2A where dark round dots 6 are arranged in a matrix.

In this manner, it is possible to recognize a cell 2a, which is darkly filled according to image data on a screen of a personal computer, as a dark cell 2A by substituting an aggregation of dark round dots 6 with n rows by n columns (n is an integer) for the cell 2a, and to perform burning with performing coordinate management. Therefore, runover portions 3 and a blank portion 4 are not formed differently from the conventional method, and hence it is possible to enhance read accuracy.

In particular, in case of burning on a resin material, the reaction of the resin material to the heat of a laser is fast, and hence the profile of a cell obtained by line-drawing continuous formation through conventional vector-marking becomes unclear. A method of the present invention can limit the radiation area 5 and can apply the laser beam without overlapping the laser beam by making a diameter of the dark round dot be the same as a beam diameter of the laser beam. Therefore, the profile of a cell is clear and adjustment of a burnt color is easy.

Figure 5:
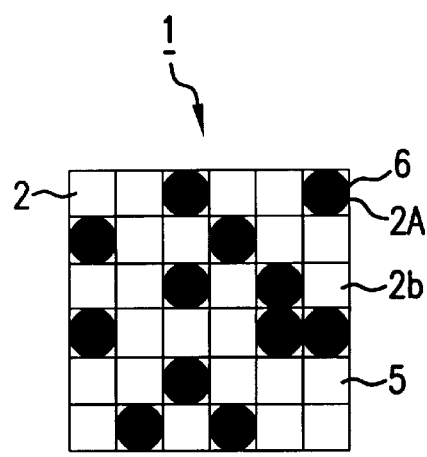
FIG. 5 is a top view of a two-dimensional code in case of forming one dark cell with one dark round dot according to another embodiment of the present invention.

FIG. 5 shows another embodiment of the present invention, in the embodiment a two-dimensional code 1 being divided into 36 radiation areas 5 with 6 rows by 6 columns. A dark round dot 6 is burnt in one of radiation areas 5, corresponding to a dark cell in the image data of the two-dimensional code composed of dark and bright unit cells arranged in a matrix, by sequentially applying a laser beam with performing position control in the X-Y directions. In this case, a diameter of the dark round dot 6 is made to be the same as the length of a side of the unit cell 2. Thus, in this case, the dark cell 2A is composed of one dark round dot 6, and hence this is the case of n=1 in regard to the matrix with n rows by n columns.

A case of applying the above-described method to a stainless steel plate will be described. By dividing a two-dimensional code 1, whose side was 480 μm long, into 16 pieces in the horizontal direction by 16 pieces in the vertical direction to form 256 radiation areas 5 whose side is 30 μm long. As shown in FIG. 5, a dark round dot 6 whose diameter was 30 μm was burnt in one of radiation areas 5, corresponding to a dark cell in the image data of the two-dimensional code, by applying a laser beam with performing position control in the X-Y directions. Twelve alphanumeric characters could be recorded in the two-dimensional code 1 burnt on a surface of the stainless steel plate in this manner.

Figure 6:
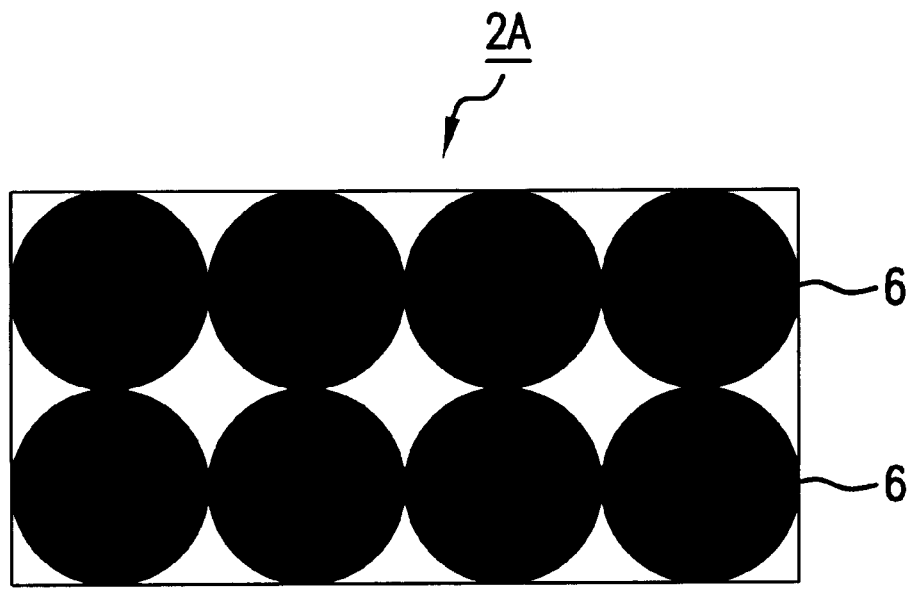
FIG. 6 is a top view showing a case of arranging dark round dots in a rectangular with 2 rows and 4 columns according to still another embodiment of the present invention.
Figure 7:
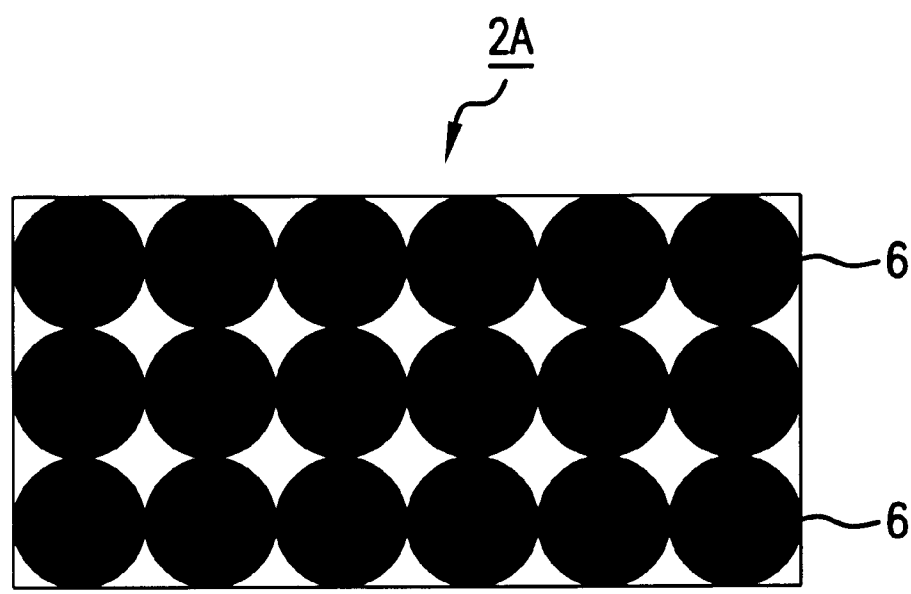
FIG. 7 is a top view showing a case of arranging dark round dots in a rectangular with 3 rows and 6 columns according to further another embodiment of the present invention.
Figure 8:
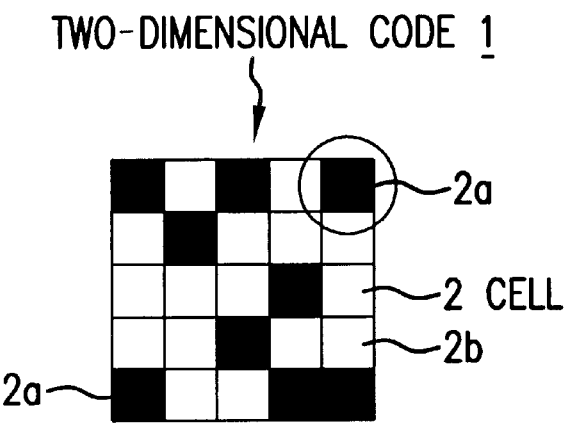
FIG. 8 is a top view showing a conventional two-dimensional code.
Figure 9A:
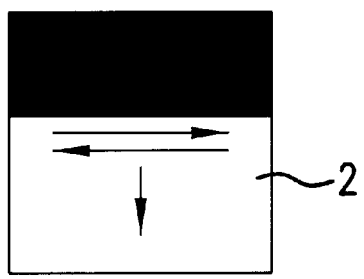
FIG. 9 is an explanatory diagram showing a conventional method for performing linear burning sequentially from an upper side to a lower side with making a laser beam horizontally scan and finally forming a cell that is darkly filled.
Figure 9B:
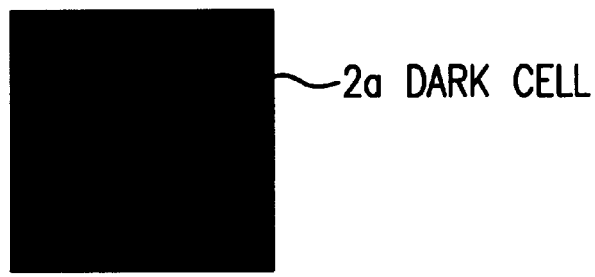
Figure 10:
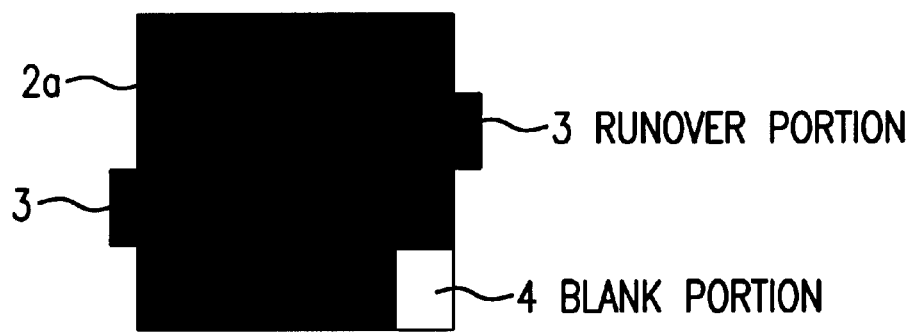
FIG. 10 is a top view of a dark cell that is formed with a conventional method and has runover portions and a blank portion.
Figure 11:
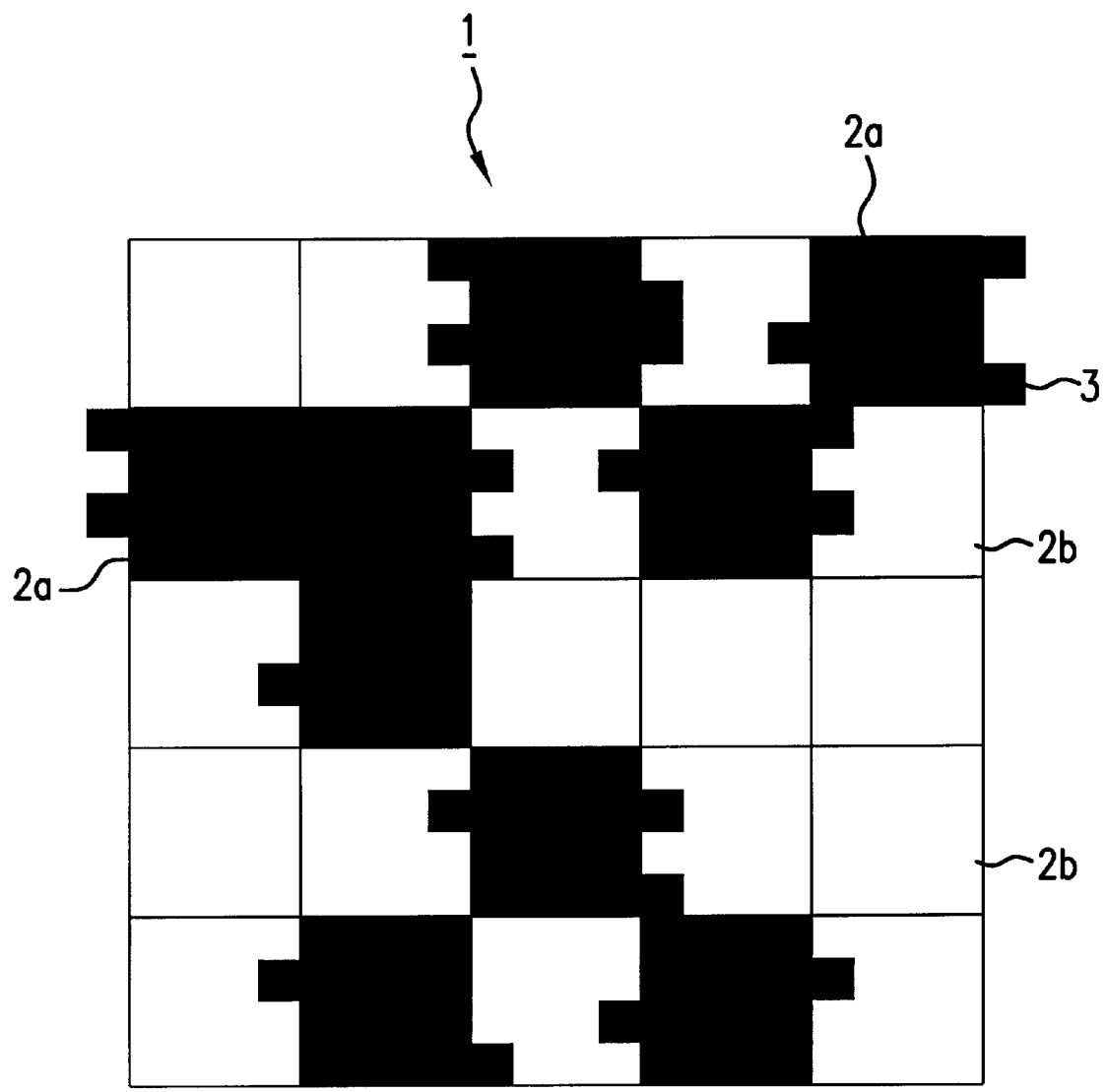
FIG. 11 is a top view of the two-dimensional code composed of dark cells, one of which is shown in FIG. 9, and bright cells.

In addition, although, in the above-described description, such cases that the dark round dots 6 are arranged in matrices with 1 row by 1 column, 4 rows by 4 columns, and 8 rows by 8 columns are shown, dark round dots 6 can be arranged in an nth square matrix such as 2 rows by 2 columns, 3 rows by 3 columns, or 6 rows by 6 columns. In addition, regarding the shape of a cell, a rectangular cell with n rows by m columns (m is an integer) such as 2 rows by 4 columns as shown in FIG. 6, or 3 rows by 6 columns as show in FIG. 7 can be used. Furthermore, a dark dot is not limited to a black dot, but, so long as the color of the dot is dark such as gray and there is the difference between darkness and brightness in contrast with a bright cell, other combination can be used.

In addition, the present invention can be widely applied to material, which can be burnt with a laser, such as paper and wood, besides metal, resin, and ceramics. Furthermore, in the above-described description, such cases that the present invention is applied to an opaque material such as metal, a resin, ceramics, paper, and wood that constructs a dark unit cell 2A by laser burning are shown. Nevertheless, if the two-dimensional code 1 is formed on a transparent material such as a silicon plate, a glass plate, and a gem, a dark cell 2A and a bright cell 2b are reversed.

Thus, if the two-dimensional code 1 is read with an optical reflection type reader, light passes through and no reflection arises on a part, where is not processed, since the silicon plate is transparent. Hence, the reader recognizes the part as a dark unit cell 2A. In addition, since a dot 6, which is burnt by laser burning, has a rough surface, light is reflected here, and hence the reader recognizes the dot as a bright unit cell 2b. Also, if a black coating is formed on a white resin plate and a dark and bright pattern is formed by exposing the white resin plate, which is a base material, through burning the black coating with applying a laser beam, a part where the laser beam is applied becomes the bright cell 2b.

As described above, according to a formation method of a two-dimensional code according to the present invention, this method comprises the steps of substituting a square unit cell, in which dots are arranged in a matrix, for a dark or bright cell in image data of a two-dimensional code, applying a laser beam to a marking surface of metal, a resin, ceramics, a transparent material or the like for directly burning, and forming the dots on the marking surface with thermal deformation. Therefore, since there is no irregularity such as a runover portion and a blank portion, read accuracy increases, and this method is effective in the case that a minute two-dimensional code whose side is 1 mm long is formed. Furthermore, by making a diameter of the dot to be the same as a beam diameter of the laser beam, it is possible to burn the dots at radiation intervals of the laser beam, and hence it is possible to generate a two-dimensional code in a short time.

What is claimed is:

1. A formation method of a two-dimensional code for forming the two-dimensional code, in which unit cells in a dark and bright pattern are arranged in a matrix, on a marking surface by laser burning, comprising the steps of: substituting a square unit cell, in which dots are arranged in an n×n or n×m matrix, n and m are integers, for a unit cell, forming a dark or bright unit cell by the laser burning, in image data of the two-dimensional code; irradiating the marking surface of metal, resin, ceramics, a transparent material, or the like with a laser beam for direct burning; forming dots on the marking surface through thermal deformation; and forming the two-dimensional code in a dark and bright pattern formed by combining dark or bright unit cells and bright or dark unit cells to which the laser burning has not even performed.

2. A formation method of a two-dimensional code according to claim 1, wherein a diameter of the dot is made to be a beam diameter of the laser beam.

* * * * *